June 24, 1969          J. P. WATSON          3,451,516

ELECTROMAGNETIC CLUTCH HAVING ECCENTRICALLY MOUNTED POLES

Filed Jan. 12, 1968          Sheet 1 of 3

Inventor:
JAMES P. WATSON
By     Attorney

Inventor:
JAMES P. WATSON
By *[signature]*
Attorney

Inventor:
JAMES P. WATSON
By Samuel Cohen
Attorney

United States Patent Office 3,451,516
Patented June 24, 1969

3,451,516
ELECTROMAGNETIC CLUTCH HAVING ECCENTRICALLY MOUNTED POLES
James P. Watson, Jupiter, Fla., assignor to Radio Corporation of America, a corporation of Delaware
Filed Jan. 12, 1968, Ser. No. 697,426
Int. Cl. F16d 27/00, 37/02, 19/00
U.S. Cl. 192—84                                3 Claims

ABSTRACT OF THE DISCLOSURE

An electromagnetic clutch or brake having annular pole pieces which are eccentrically mounted to either the driver or driven shaft.

Background of the invention

It has been found in the operation of electromagnetic clutches and brakes, such as those employed in printers for computers, that after a period of operation considerably shorter than expected, the closing force between the driver and driven elements greatly decreases even though there is no diminution in the magnetic flux linking the parts. This invention relates to the solution to this problem.

Summary of the invention

The decrease in closing force discussed above occurs, it has been found, because, as the clutch wears, the flux distribution changes. The transverse component—the component contributes little to the closing force, increases whereas the perpendicular component—the one mainly responsible for the closing force, decreases. The solution of the present invention is to so design the clutch that the amount of this flux redistribution which occurs is reduced and the rate at which the flux redistributes is much slower than that of the known clutch. The design involves fixing the annular pole pieces to, for example, the driver shaft, in eccentric fashion so that they produce only relatively wide, relatively shallow grooves in the armature plate. In view of the eccentric mounting of the pole pieces, only a small portion of the periphery of each pole piece is in close proximity to the groove edges. The transverse flux occurs only at these relatively short contact points and in view of this and of the fact that the amount of such flux, when present, is a function of the groove depth, such transverse flux is minimized.

Detailed description

Figure 1:
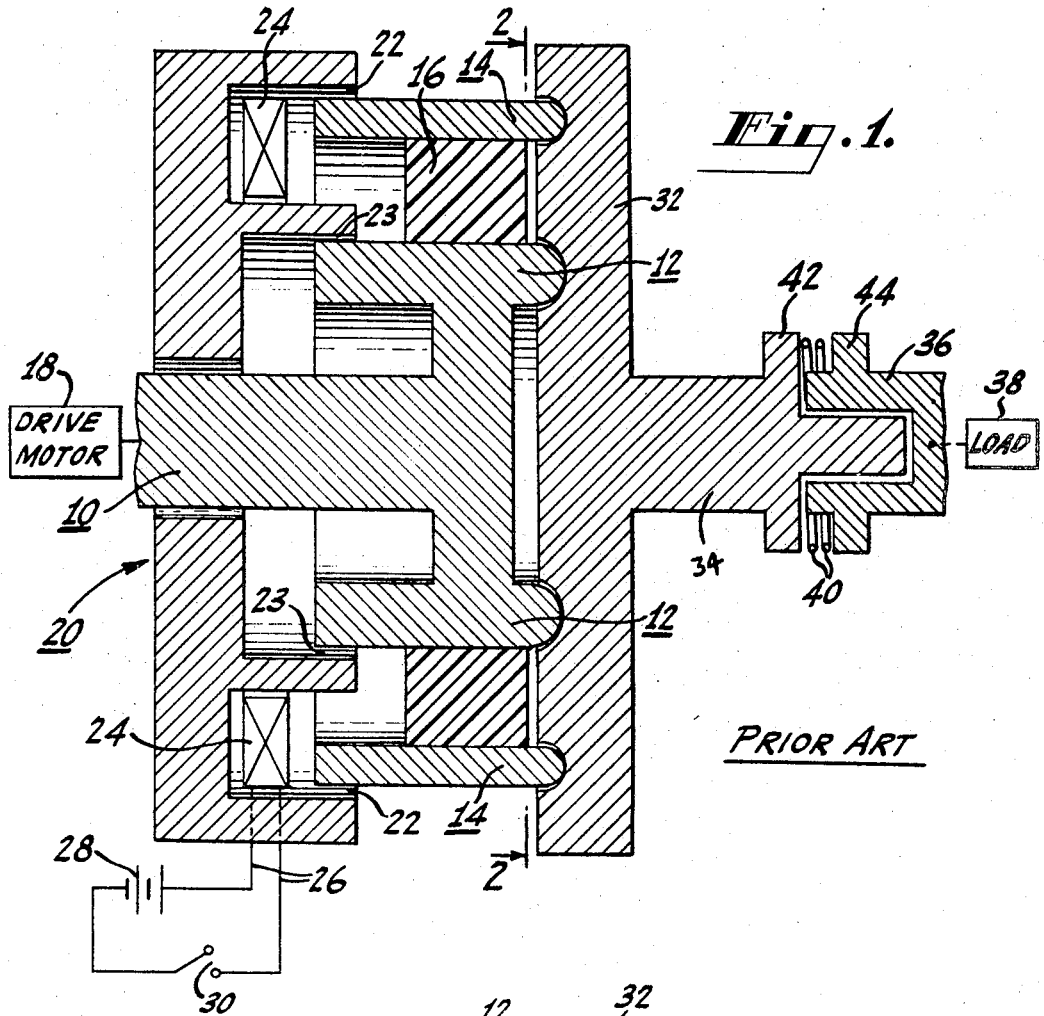
FIG. 1 is a section through a known electromagnetic clutch.
Figure 3:
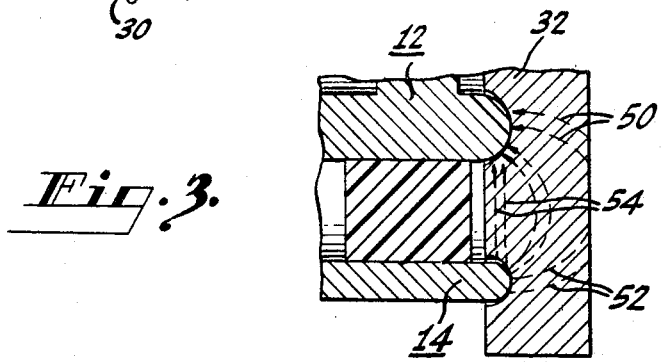
FIG. 3 illustrates the magnetic fields produced in a portion of the structure of FIG. 1.
Figure 2:
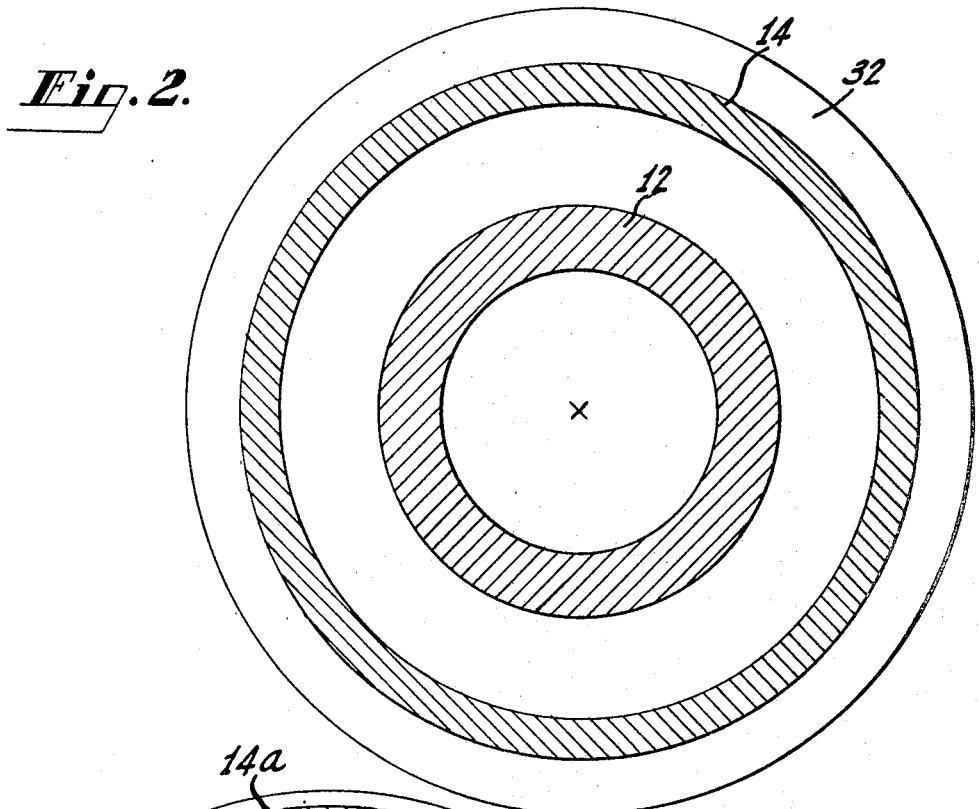
FIG. 2 is a section view along line 2—2 of FIG. 1.

The known electromagnetic clutch of FIGS. 1–3 consists of three major assemblies. The driver part includes an input shaft 10 to which is fixed an annular inner pole piece 12. An annular outer pole piece 14 is fixed to the inner pole piece by an insulating, that is, by a non-magnetic, ring-shaped element 16. This entire assembly is continuously driven by a drive motor shown schematically at 18.

The magnetic field for the annular pole pieces 12 and 14 is produced by a stationary annular electromagnet 20. This magnet is magnetically coupled to the pole pieces via very small annular air gaps 22 and 23. The field for this magnet is produced by a coil 24 which is connected by wires 26 to a power supply shown schematically as battery 28. The electromagnet is actuated by closing the switch 30 in the electromagnet circuit. The switch may be the contacts of a relay (not shown) or an electronic switch such as a semiconductor device (not shown).

The third part of the clutch assembly includes the circular armature plate 32, formed of a magnetic material such as iron, which is splined to the output shaft 36 which, in turn, is mechanically coupled to the load 38. The purpose of the spring 40, which may be located between the raised ridges 42 and 44, is to continuously urge the armature plate into light engagement with the ends of the pole pieces 12 and 14. While shown as a coil spring, in practice, element 40 may instead be a dished flat spring.

In the operation of the clutch of FIG. 1, the drive motor 18 continuously drives the shaft 10 and the pole pieces 12 and 14. The pole pieces lightly engage the armature plate 32 but this does not cause any appreciable wear. The armature plate 32 and shafts 34 and 36 remain stationary.

When the switch 30 is closed, the magnets 12 and 14 become magnetized and a strong attractive force occurs between the armature plate and the pole pieces 12 and 14. Within a short interval of time, the armature plate accelerates from its stationary position until it is rotating at the same speed as the drive shaft 10. The load 38, which is mechanically coupled to the armature plate, is accelerated in the same fashion.

After a relatively short period of use, the pole pieces 12 and 14 form annular grooves, as shown in FIG. 1, in the armature plate 32. While this wear eventually causes the armature plate to fail, it would appear that as the grooves become deeper and the apparent amount of surface of the armature plate engaged by the pole pieces would increase, the amount of holding power between the two elements, when the magnets were actuated, would increase. In other words, it might appear that in addition to the magnetic force produced by the magnet, the amount of frictional engaging force would increase and the overall acceleration of the load in response to the energization of the clutch would increase.

In practice, the above has been found not to be the case. Contrary to expectations, as the grooves in the clutch plate deepen, the amount of slippage between the pole pieces and armature plate also increases. The reason, it has been discovered, is that as the grooves deepen, while the total amount of magnetic flux does not decrease, a greater percentage of this flux becomes ineffective in attracting the armature plate to the pole pieces.

When the clutch plate is relatively unworn, the flux lines initially are all substantially perpendicular to the ends of the pole pieces. This flux results in strong magnetic attraction of the plate 32 to the pole pieces. Flux lines of this type are shown, for example, at 50 and 52 in FIG. 3. However, as grooves become worn into the surface of the armature plate 32, a part of the magnetic flux takes the shorter path, radial in direction, between the two pole pieces 12 and 14, as shown at 54 in FIG. 3. (The principle of conservation of flux indicates that the flux lines will always attempt to follow the shortest possible flux path.)

It turns out that radial flux lines have very little effect in attracting the plate 32 to the pole pieces. One qualitative explanation for this is that these flux lines from poles 12 and 14 attempt to pull the plate in opposite directions and therefore these forces tend to cancel. In any case, whether or not this explanation is correct, it has been found, in practice, that in the presence of grooves in plate 32, the magnetic attractive force between the pole pieces and the plate deteriorates very rapidly.

Figure 5:
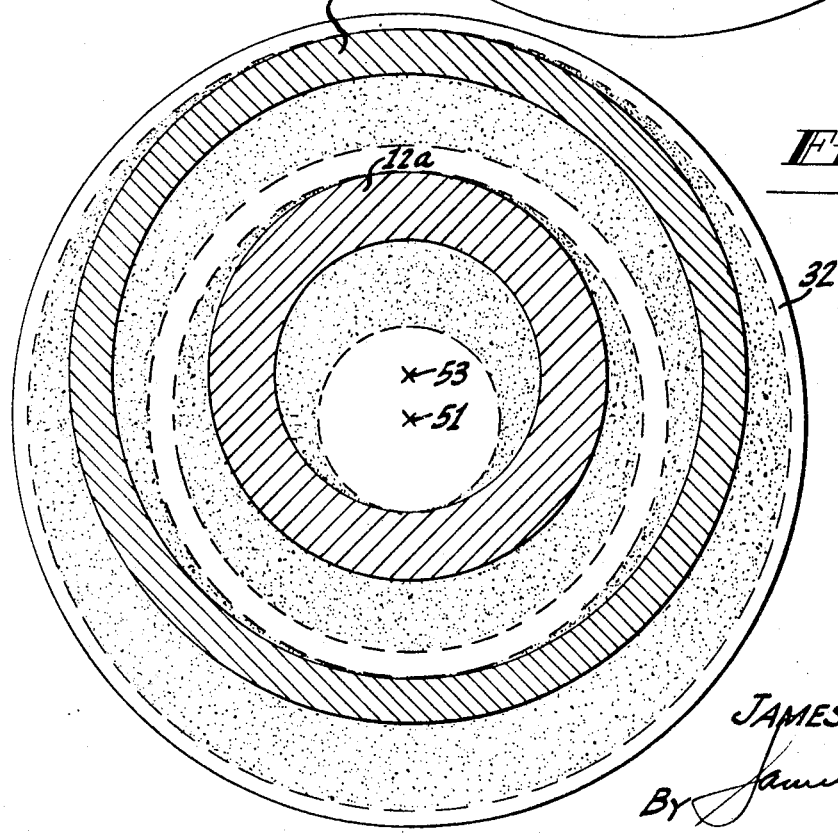
FIG. 5 is a section taken along the line 5—5 of FIG. 4.
Figure 4:
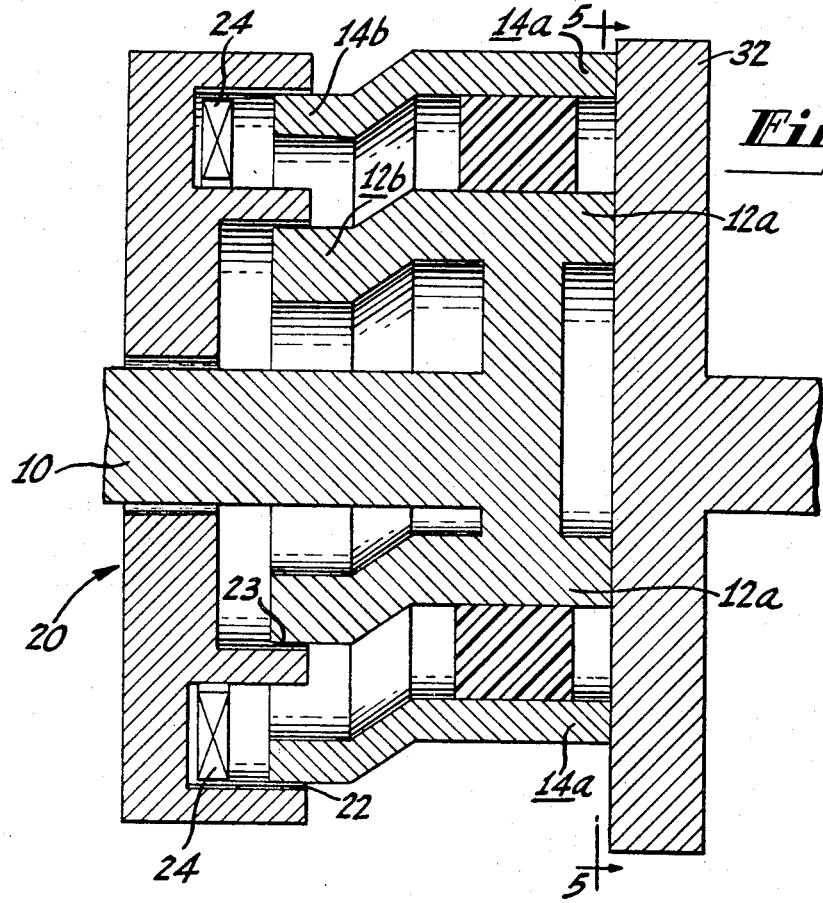
FIG. 4 is a cross section through the electromagnetic clutch of the invention.
Figure 6:
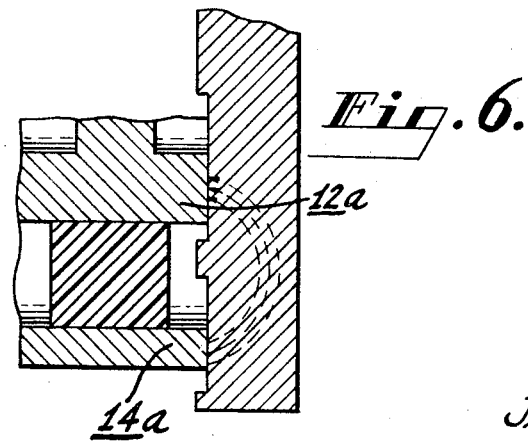
FIG. 6 shows the magnetic fields produced in a portion of the structure of FIG. 4.

The problem above has been solved according to the invention by the improved structure shown in FIGS. 4–6. This structure includes all of the parts of FIG. 1 but only some of them are shown. The principal difference between this structure and the FIG. 1 structure is that the portions 12a and 14a of the annular pole pieces rather than being centered (the point 51 in FIG. 5) on the shaft 10, are eccentrically mounted thereto (their common center is shown at 53 in FIG. 5). The portions 12b and 14b of the annular pole pieces, however, are concentric with the shaft 10 so that no change in the structure of the electromagnet 20 is necessary.

The effect of mounting the pole pieces in this way is shown in FIGS. 5 and 6. Now, each annular pole piece traces out a relatively large area, shown dotted in FIG. 5, on the armature plate 32. And, the rate at which the grooves are formed decreases and this increases the life of the plate 32. However, this is only of minor significance in the present invention. What is important is that the amount of transverse flux which is created is minimized. Such flux occurs only where the pole pieces contact the edges of their respective grooves and, as can be seen in FIG. 5 this occurs only over a small percentage of the circle. In addition, since the amount of time it takes the grooves in FIG. 6 to reach a given depth is many times longer than it takes the grooves in the prior art arrangement of FIGS. 1–3 to reach the same depth, it takes much longer to produce a given number of radial flux lines in the FIGS. 4–6 arrangement than it does in the FIGS. 1–3 arrangement.

It is expected that the satisfactory working life of an electromagnetic clutch will be increased five to ten times by the improvement of the present invention.

It is to be understood that this invention, while described in terms of a clutch, is equally applicable to an electromagnetic brake. Further, while the pole pieces are shown fixed to the driver shaft, they could be fixed to the driven shaft instead.

What is claimed is:
1. An electromagnetic device comprising, in combination:
   a driver shaft;
   a driven shaft aligned with the driver shaft;
   a plate formed of magnetic material fixed to one of said shafts;
   two concentric, annular, electromagnetic pole pieces in operative relationship with said plate and fixed to the other of said shafts in off-centered fashion; and
   means coupled to said annular pole pieces for energizing said pole pieces to cause them magnetically to attract said plate.

2. A magnetic clutch as set forth in claim 1, and further including means for continuously urging said plate into light engagement with the ends of said pole pieces.

3. An electromagnetic device comprising, in combination:
   a driver shaft;
   a driven shaft aligned with the driver shaft;
   a plate formed of magnetic material fixed to one of said shafts;
   two concentric, annular, electromagnetic pole pieces fixed to the other of said shafts, each such pole piece including a first portion which is eccentrically mounted to said shaft and the end of which is adjacent and parallel to, and in operative relationship with said plate, and a second portion which is a continuation of said first portion but which is concentrically mounted to said shaft; and
   fixed, annular electromagnet means, concentric with said other of said shafts, spaced from the free ends of said second portion of said pole pieces by relatively small air gaps, for energizing said pole pieces to cause them magnetically to attract said plate.

References Cited

UNITED STATES PATENTS

| 3,019,876 | 2/1962 | Rabinow. |
| 3,055,470 | 9/1962 | Pierce. |
| 3,251,444 | 5/1966 | Erban. |

CARLTON R. CROYLE, *Primary Examiner.*

A. D. HERRMANN, *Assistant Examiner.*

U.S. Cl. X.R.
192—107